L. R. ZIFFERER.
EXPANSION DEVICE.
APPLICATION FILED DEC. 18, 1915.

1,224,698.

Patented May 1, 1917.

Witness:
Harry S. Gaither

Inventor:
Lothar R. Zifferer
by Blaming & Blaming
Attorneys

UNITED STATES PATENT OFFICE.

LOTHAR R. ZIFFERER, OF RIDGEWOOD, NEW JERSEY.

EXPANSION DEVICE.

1,224,698.  Specification of Letters Patent.  Patented May 1, 1917.

Application filed December 18, 1915. Serial No. 67,591.

*To all whom it may concern:*

Be it known that I, LOTHAR R. ZIFFERER, a citizen of the United States, residing at Ridgewood, in Bergen county and State of New Jersey, have invented certain new and useful Improvements in Expansion Devices, of which the following is a specification.

This invention relates to a fastening device employing wings which expand into locking position, and is concerned particularly with the construction and arrangement of its various parts.

Among the objects of my invention I have sought to provide a fastening device consisting of the fewest possible parts, and which in consequence can be made at the least expense; a device in which the expanding wings are duplicates of each other, thereby enabling a single die to be used for their manufacture; a device in which the parts engage with each other in such a manner as to present the strongest possible construction; and a device which is capable of adjusting itself to various requirements of use. These and other objects of my invention will more fully hereinafter appear from the specification and claims and from the drawing in which:—

Figure 3:
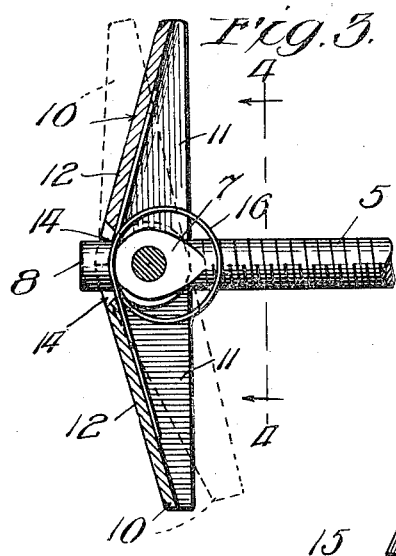
Fig. 3 is a longitudinal section through the expanding wings of the device.
Figure 4:
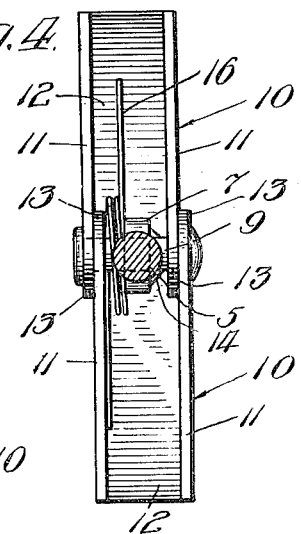
Fig. 4 is a cross-section taken on line 4—4 of Fig. 3, looking in the direction of the arrows.
Figure 5:
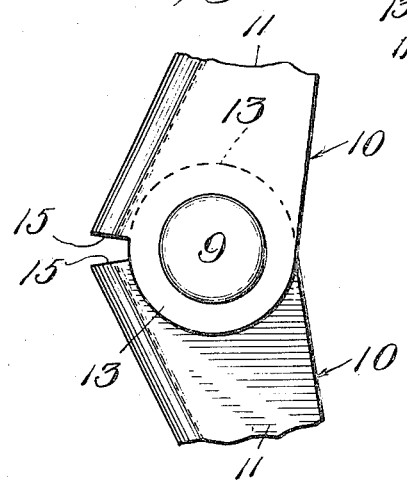
Fig. 5 is a fragmentary side elevation on an enlarged scale of the pivoted ends of the expanding wings, the wings being not quite fully expanded.

The drawing which exhibits an exemplification of my invention shows a fastening device consisting of a bolt 5 on which a nut 6 is threaded. The head end of the bolt is flattened as at 7, and is formed with an eye centrally therein. The extremity 8 of the bolt projects slightly beyond the flattened portion 7, as appears best in Fig. 3.

A pin 9 extends through the eye formed in the flattened portion of the bolt, and this serves as a pivotal mounting for two wings 10. These wings are shown to be duplicates of each other, and may be formed conveniently by the use of a single die. In cross section these wings are generally U-shaped, having side walls 11 and a connecting wall 12. Each of the wings at one end is provided with a pair of ears 13, being formed by an extension of the walls 11. It is through these ears that the pin 9 passes. As clearly appears in Fig. 3, moreover, these wings overlap each other. At the pivotal ends the connecting wall of each wing is cut away as at 14, to provide a generally round opening through which the extremity 8 of the bolt may project. A portion 15 of the end of each connecting wall 12 is preserved, however, and these portions 15 constitute shoulders which engage with each other when the wings are expanded to determine the limit of expansion of the wings. To insure expansion of the wings, I have provided tension means 16 located within the hollow portions of the wings.

Figure 1:
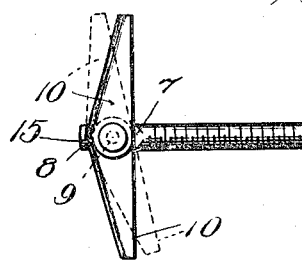
Figure 1 is a side elevation of my expansion device.
Figure 2:
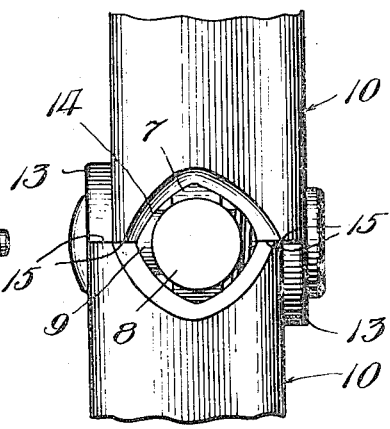
Fig. 2 is a fragmentary end elevation thereof, on an enlarged scale.

It will be observed that the wings of my device are not situated in direct alinement. This is necessary because each wing is of the same size and shape as the other, and because one ear 13 of each wing must occupy an exterior position with relation to the other wing. The opening formed by the cutaway portions 14 is larger than necessary to allow the end 8 of the bolt to protrude therethrough, in order to permit a certain amount of loose swinging movement of the wings upon the bolt. The two wings, therefore, while rigid with respect to each other, may nevertheless assume a right angular position with respect to the bolt, or any one of a number of other angular positions within considerable limits, as indicated by the dotted lines in Figs. 1 and 3.

In use the fastening device is ordinarily secured to a hollow wall, the wings being folded together so as to pass through a relatively small opening. The bolt moreover may pass through the wall in an oblique position, with the wings disposed against the inner face of the wall, or the bolt may pass straight into the wall with the wings disposed angularly with respect to the face of the wall if the inner side thereof be uneven or irregular. In either case the fastening device will be enabled to adjust itself to the position required, with the wings bearing squarely against the inside of the wall. The edges of the side walls 11 constitute the bearing surfaces of the wings against the inner face of the wall. The edges of one wing are disposed in the same plane with the edges of the other wing, when expansion has taken place, due to the fact that the shoulders 15 are arranged to engage with each other at precisely the point necessary to insure this straight-line relation.

The construction of the wings, and the manner in which they are loosely pivoted to the bolt, may be varied to some extent without in any way departing from the present invention. It is obvious that a fastening device, such as the one herein disclosed, may be very conveniently and economically manufactured, and will be both reliable and strong in use. In addition, the parts are so related and arranged as to fold compactly, so that only a small opening is required in order to enable the device to be inserted within a hollow wall. Obviously, the object to be secured upon the wall may be readily attached upon the protruding end of the bolt, so that the operation of the device involves but little time or labor.

I claim:

1. An expansion device comprising, in combination, a bolt, a pair of wings pivotally mounted upon the bolt, the wings being U-shaped in cross-section and arranged to fold upon the bolt with the side walls of the wings overlapping the bolt, and each wing being provided with interengaging shoulders for determining the limit of expansion of the wings with respect to each other, substantially as described.

2. An expansion device comprising, in combination, a bolt, a pair of wings pivotally mounted upon the bolt, the wings being U-shaped in cross-section and arranged to fold upon the bolt with the side walls of the wings overlapping the bolt, there being means independent of the bolt for determining the limit of expansion of the wings, with respect to each other, substantially as described.

3. An expansion device comprising, in combination, a bolt, a pair of wings pivotally mounted upon the bolt, there being means for limiting the expansion of the wings with respect to each other, to a position where their bearing faces are in alinement with each other, said wings when fully expanded being capable of angular adjustment with respect to the bolt, substantially as described.

4. An expansion device comprising, in combination, a bolt, a pair of wings pivotally mounted upon the bolt, the wings being U-shaped and of the same size in cross-section, whereby the wings are pivoted out of alinement with each other, there being means for determining the limit of expansion of the wings with respect to each other, substantially as described.

5. An expansion device comprising, in combination, a bolt, a pair of wings pivotally mounted upon the bolt, the wings being U-shaped in cross-section, tension means for expanding the wings situated in the hollow portion of the wings at the pivotal ends thereof, there being means for determining the limit of expansion of the wings with respect to each other, substantially as described.

6. An expansion device comprising, in combination, a bolt, a pair of wings pivotally mounted upon the bolt, the wings being U-shaped in cross-section and having interengaging shoulders for determining their limit of expansion with respect to each other, each of said wings at its pivotal end having a portion of its body cut away to provide an opening through which the bolt may protrude without engaging with the wings, substantially as described.

7. An expansion device comprising, in combination, a bolt, a pair of wings pivotally mounted upon the bolt, the wings being U-shaped in cross-section and having a portion thereof at the pivotal end of each cut away to provide an opening through which the bolt may protrude without engaging with the wings, said wings being formed to engage with each other to determine the limit of their expansion with respect to each other, substantially as described.

8. In a device for the purpose specified, the combination of a bolt, and co-axially pivoted wings in operative relation with the bolt, there being means independent of the bolt for limiting the expansion of the wings with respect to each other, substantially as described.

9. In a device for the purpose specified, the combination of a bolt, and a pair of wings pivotally mounted in operative relation with the bolt, the wings being provided with inter-engaging shoulders for determining their limit of expansion with respect to each other, and when fully expanded being capable of angular adjustment with respect to the bolt, substantially as described.

LOTHAR R. ZIFFERER.

Witnesses:
H. E. CHAMPION,
J. M. CRAVEN.

Copies of this patent may be obtained for five cents each, by addressing the "Commissioner of Patents, Washington, D. C."